United States Patent [19]

Spivak

[11] Patent Number: 5,071,289

[45] Date of Patent: Dec. 10, 1991

[54] PARTICULATE DELIVERY SYSTEM

[75] Inventor: Philip Spivak, Toluca Lake, Calif.

[73] Assignee: Alpheus Cleaning Technologies Corp., Rancho Cucamonga, Calif.

[21] Appl. No.: 457,337

[22] Filed: Dec. 27, 1989

[51] Int. Cl.$^5$ .............................................. B65G 53/66
[52] U.S. Cl. ........................................ 406/11; 406/14; 406/136; 406/128; 406/192; 406/30
[58] Field of Search ............... 406/11, 12, 136–138, 406/90, 91, 19, 192, 14, 15, 29, 30, 31, 144, 153, 93, 109, 128

[56] References Cited

U.S. PATENT DOCUMENTS

| | | | |
|---|---|---|---|
| 2,536,402 | 1/1951 | Voorhees | 406/136 X |
| 2,771,323 | 11/1956 | Taylor | 406/30 X |
| 2,919,159 | 12/1959 | LaCroix | 406/137 |
| 3,099,497 | 7/1963 | Albert . | |
| 3,149,884 | 9/1964 | Jones | 406/138 |
| 3,195,775 | 7/1965 | Thomas et al. . | |
| 3,258,296 | 6/1966 | Von Funk . | |
| 3,363,806 | 1/1968 | Blakeslee et al. . | |
| 3,454,307 | 7/1969 | Bishop . | |
| 3,858,943 | 1/1975 | Bose et al. . | |
| 3,905,650 | 9/1975 | Freeman | 406/136 X |
| 4,029,365 | 6/1977 | Ahrens et al. . | |
| 4,059,311 | 11/1977 | Spitzer et al. | 406/90 X |
| 4,116,367 | 9/1978 | Kataoka et al. | 406/137 X |
| 4,118,074 | 10/1978 | Solt . | |
| 4,383,766 | 5/1983 | Eriksson . | |
| 4,412,762 | 11/1983 | Lepley et al. . | |
| 4,420,957 | 12/1983 | Weber . | |
| 4,799,831 | 1/1989 | Ariaz | 406/136 |
| 4,830,545 | 5/1989 | Salter et al. | 406/136 X |

FOREIGN PATENT DOCUMENTS

| | | | |
|---|---|---|---|
| 1058639 | 3/1954 | France | 406/31 |
| 1523375 | 3/1968 | France | 406/136 |
| 31939 | 2/1988 | Japan | 406/14 |

OTHER PUBLICATIONS

*Bulk Solids Handling*, by C. R. Woodcock and J. S. Mason, Title Page, pp. 113–115, 125–135, 188–193, 426–427, no date.

*Pneumatic Conveying of Bulk Materials*, by Milton N. Kraus, pp. 14–25, no date.

"Trost Air Impact Mills/Pulverizers" article, Martin Engineering Company, Mar., 1989.

*Primary Examiner*—Dennis H. Pedder
*Assistant Examiner*—James M. Kannofsky
*Attorney, Agent, or Firm*—Sheldon & Mak

[57] ABSTRACT

A system for delivering a particulate material has a closed storage hopper for the material, the hopper having a bottom hopper outlet and a check valve connected to a top portion of the chamber for venting positive pressure from the chamber; a venturi eductor having a material inlet for feeding the material, an eductor outlet, and a gas inlet; a gas feed valve, the gas feed valve being openable in response to a feed signal for activating the educator; a hopper passage connecting the hopper outlet to the eductor material inlet; a hopper outlet valve for closing the hopper outlet in response to a hopper signal; a stir valve for pressurizing the hopper passage in response to a stir signal for agitating the material in the hopper; and a pressure sensor for momentarily activating the stir signal in response to an absence of the material at the material inlet, the system being operative in a transporting mode wherein the hopper valve is open, the feed valve is open, and the stir valve is closed; a stirring mode wherein the hopper valve and stir valves are open; a purging mode wherein the hopper and feed values are closed and the stir value is activated; and an override mode wherein the hopper and stir valves are open and the feed valve is closed. The system automatically responds to a predetermined number of activations of the stir signal within a fixed period of time, by entering the purging mode.

20 Claims, 4 Drawing Sheets

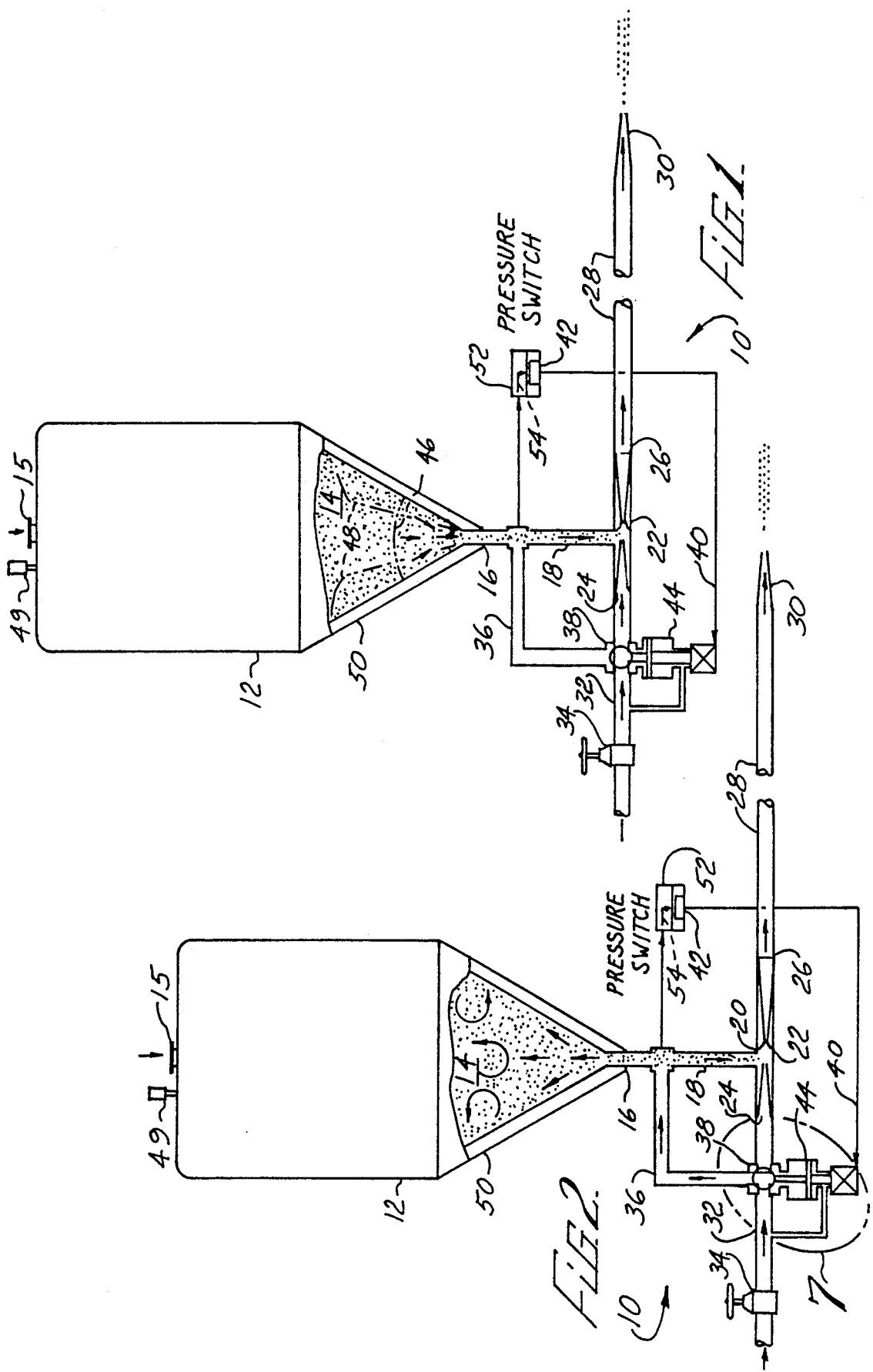

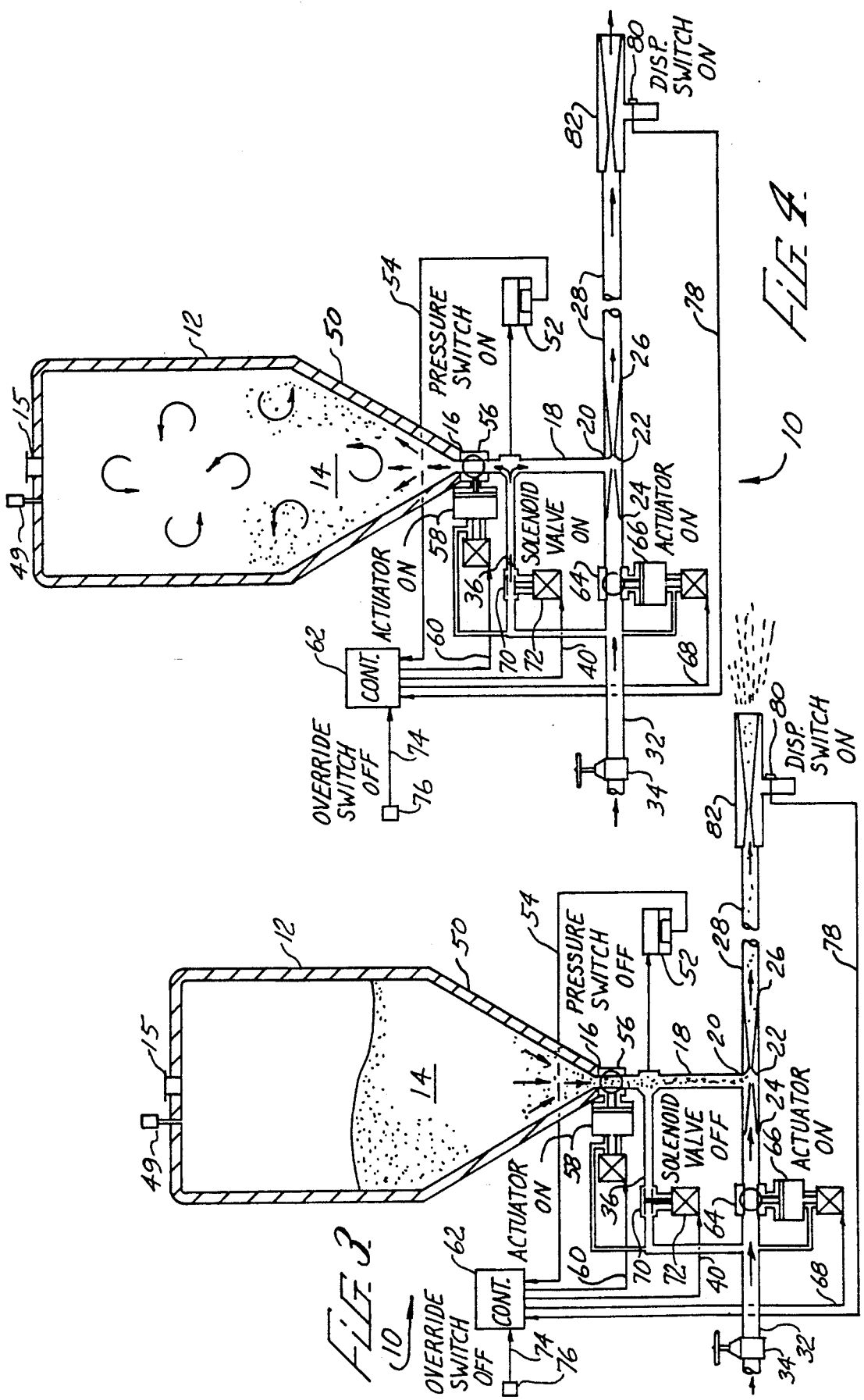

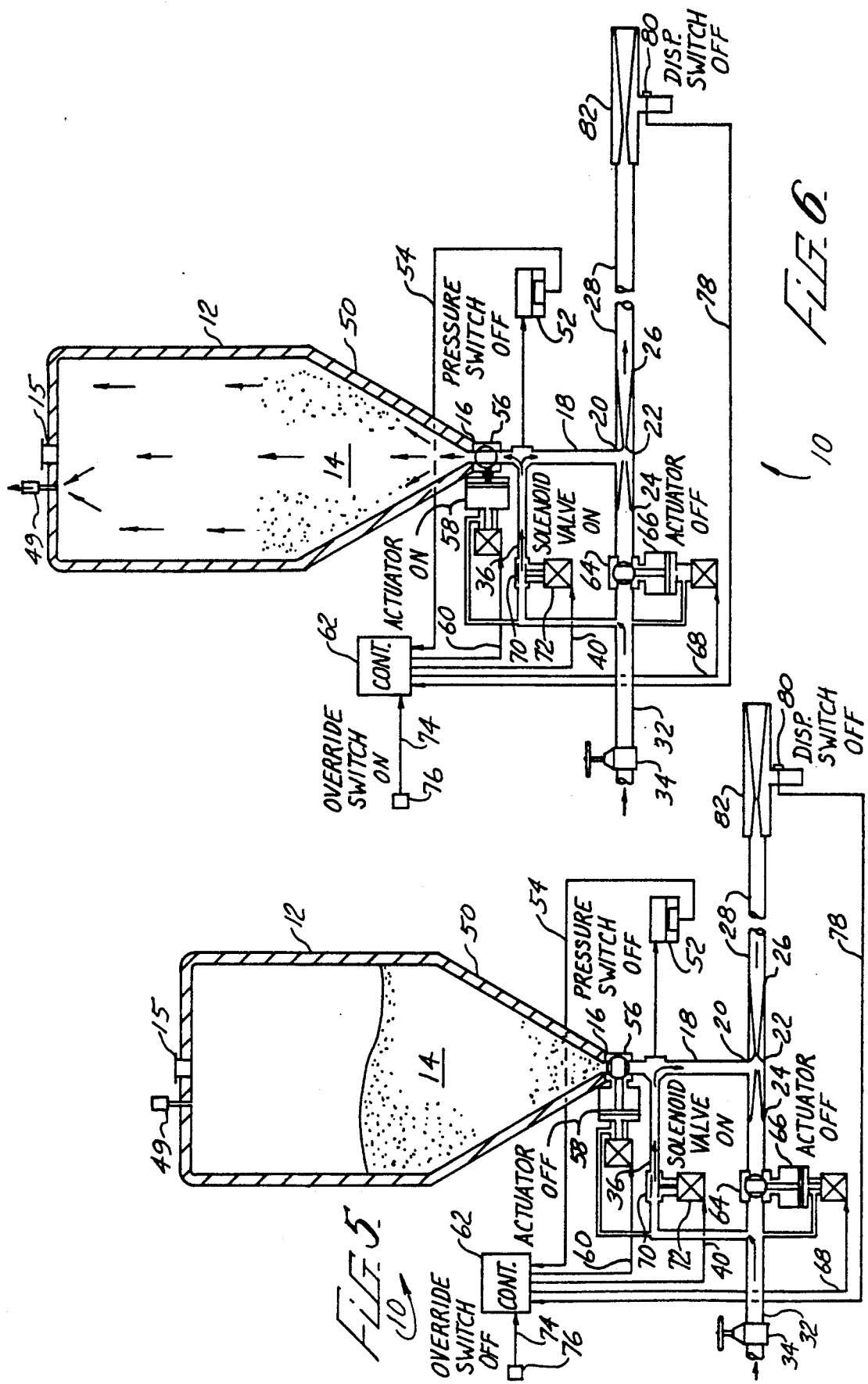

PARTICULATE DELIVERY SYSTEM

BACKGROUND

The present invention relates to systems for transporting particulate materials, and more particularly to a system for feeding such materials from a hopper with delivery by discharge along with a pressurized gas.

It is commonly known to incorporate a mechanical agitator or stirring device in a hopper for promoting uniform and controlled distribution of a particulate sold such as powder or pellets. It is also known to impart vibratory motion to a hopper or its contents for creating a zone of liquidation or fluidization proximate an outlet of the hopper, thereby avoiding the formation of a "bridge" or "rat hole" that would impede further movement of the material from the hopper. For example, a pneumatic vibrator is disclosed in U.S. Pat. No. 3,363,806 to Blakeslee et al. Also, U.S. Pat. No. 4,383,766 to Eriksson discloses a stream of air that is fed into the lower portion of a hopper through patches of porous material, for fluidizing a powder to be fed from the hopper. U.S. Pat. No. 4,118,074 to Solt discloses the use of pulsating air for vibrating a conveyer that transports a particulate material. It is also disclosed in *Bulk Solids Handling* by C. R. Woodcock and J. S. Mason that clogging is avoided by periodic blasts of air into a hopper through an auxiliary opening proximate an outlet of the hopper.

A disadvantage of each of these agitators of the prior art is that they contribute significant complexity and expense to the systems with which they are used. The use of such agitators also involves the expenditure of significant energy resources, there being a compromise between the rate of energy consumption and the reliability of the agitation. Also, the use of a mechanical agitator within the hopper assists only locally, yet shaking the whole hopper tends to compact the contents, which undesirably promotes bridging.

In an important class of systems for pressure-discharge of particulates, pellets or particulates of a hygroscopic or deliquescent material are used, often in a very cold or frozen condition. Agitation of this class of particulates is undesirable, because of the resultant wear and pulverization of the particles. The heating associated with the agitation is also undesirable. Also, the incorporation of thermal insulation in the design of the hopper is made more difficult by the presence of agitator components. Further, the introduction of air into the hopper should be minimized for avoiding deleterious heat and/or moisture exchange with the pellets.

Thus there is a need for a particulate delivery system that effectively and reliably feeds the material while avoiding the disadvantages of the prior art.

SUMMARY

The present invention meets this need by providing a hopper-fed delivery system producing a simple and effective intermittent agitation of particulate media within the hopper for reliable delivery of the media. In one aspect of the invention, the system includes a storage hopper having a bottom hopper outlet for the material; feeder means having a material inlet and a feeder outlet for feeding the material; a hopper passage connecting the hopper outlet to the material inlet of the feeder means; stir means for agitating the material in the hopper, including means for connecting a source of pressurized gas to the hopper passage. The feeder means can be provided by an eductor having a gas inlet and means for connecting the gas inlet to the source of pressurized gas. The means for connecting the source to the hopper passage can include a stir valve, and the means for connecting the gas inlet to the source can include a gas feed valve. The stir and gas feed valves can be openable respectively in response to a stir signal and a feed signal. The stir signal can be periodically activated.

The system can further include a hopper outlet valve openable in response to a hopper signal for closing the hopper outlet, whereby the system is operative in a transporting mode wherein the hopper signal is activated, the feed signal is activated, and the stir signal is inactive; a stirring mode wherein the hopper signal is activated and the stir signal is activated; a purging mode wherein the hopper signal is inactive, the stir signal is activated, and the feed signal is activated; and an override mode wherein the hopper signal is activated, the stir signal is activated, and the feed signal is inactive.

In an alternative configuration, the system can incorporate a three-way valve having a common connection to the source of pressurized gas, the means for connecting the gas to the hopper passage including a normally closed path of the three-way valve, and the means for connecting the gas inlet to the source including a normally open path of the three-way valve, the three-way valve functioning as the stir valve and the feed valve.

The storage hopper preferably forms a closed chamber for confining and environmentally isolating the material, the system further including a check valve connected to a top portion of the chamber for venting positive pressure from the chamber. The storage chamber of the hopper can be formed with a cone shaped bottom portion, and the system can also include hopper outlet valve means for closing the hopper outlet, whereby the hopper passage can be pressurized for purging the feeder.

In another aspect of the invention, the system can further include sensor means for activating the stir signal in response to an absence of the material at the material inlet. The sensor means can include means for sensing a relative pressure proximate the material inlet. The stir signal can be activated in response to the sensed pressure being below a predetermined level, and can be operative for a predetermined first period of time in response to the sensor means. The system can also include means for reconfiguring the system upon occurrence of a predetermined number of activations of the stir signal in response to the sensor means within a fixed period of time, signifying a need for operator intervention. Moreover, the stir signal can be periodically activated without regard for activation of the sensor means.

DRAWINGS

These and other features, aspects, and advantages of the present invention will become better understood with reference to the following description, appended claims, and accompanying drawings, where:

FIG. 1 is a pictorial diagram of a particulate delivery system according to the present invention, the system operating in a transporting mode;

FIG. 2 is a pictorial diagram showing the system of FIG. 1 operating in an override mode;

FIG. 3 is a pictorial diagram showing an alternative configuration of the system the system of FIG. 1, in a transporting mode;

FIG. 4 is a pictorial diagram showing the system of FIG. 3 in a stirring mode;

FIG. 5 is a pictorial diagram showing the system of FIG. 3 in a purging mode; and FIG. 6 is a pictorial diagram showing the system of FIG. 3 in an override mode;

DESCRIPTION

Figure 8:
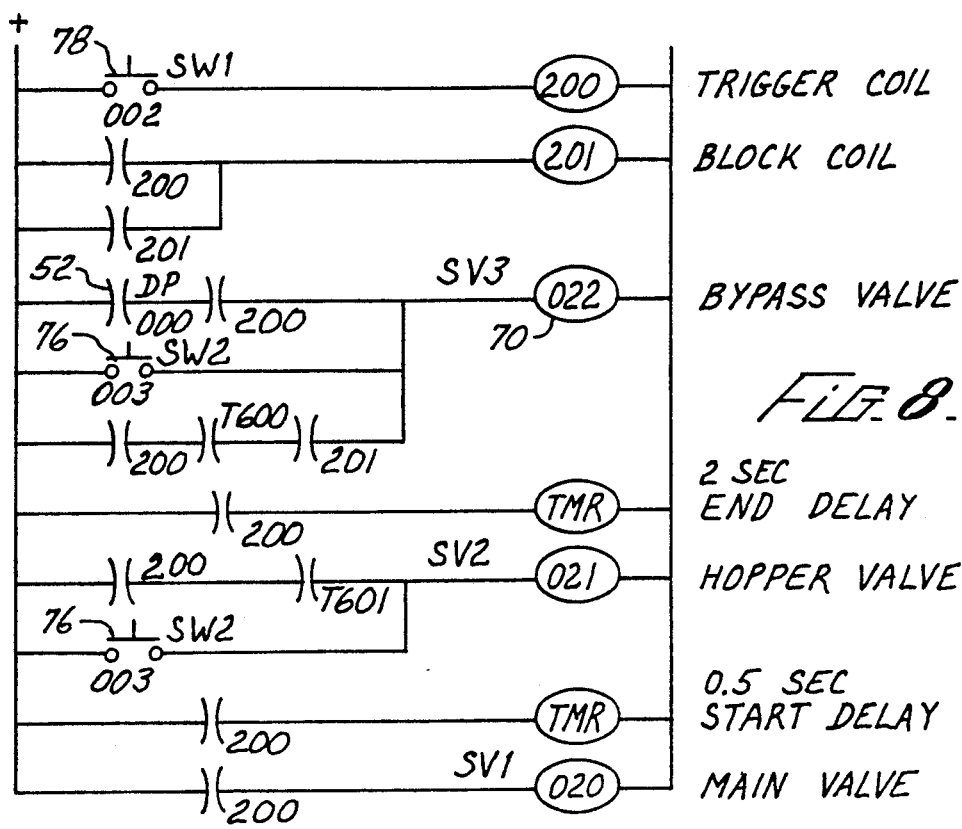
FIG. 8 is a ladder circuit diagram for a programmable controller implementing a portion of the system of FIG. 3 within region 8 thereof.

The present invention is directed to a system for controlled discharge and delivery of a particulate medium. With reference to FIGS. 1 and 2 the drawings, a particulate delivery system 10 includes a hopper 12 for receiving a quantity of a particulate media 14, the hopper 12 having an openable media inlet 15 and a bottom hopper outlet 16 that is connected to a closed, downwardly directed hopper passage 18. The passage 18 leads to a material inlet 20 of feeder means 22 for controllably feeding the media 14 from the hopper 12 in response to gas pressure at a gas inlet 24 of the feeder means 22, the media 14 being transported along with the gas through an eductor or feeder outlet 26. In an exemplary configuration of the present invention shown in the drawings, a transport passage 28 is connected to the feeder outlet 26 for delivery of the media remotely from the feeder means 22. Also, the transport passage 28 is equipped with nozzle means 30 for accelerating the media 14 as it is delivered. A main passage 32 connects the gas inlet 24 of the feeder means 22 to a suitable source of compressed air or other gas (not shown). A pressure regulator or adjustment valve 34 is interposed between the main passage 32 and the source of gas for providing a suitable gas pressure at the gas inlet 24 and a corresponding rate of flow of the media 14.

According to the present invention, a bypass passage 36 is connected to the hopper passage 18 for selectively pressurizing the hopper passage 18, whereby gas flows upwardly through the hopper outlet 16 into the hopper 12, and downwardly into the material inlet 20 of the feeder means 22. For this purpose, a stir or bypass valve 38 selectively connects the bypass passage 36 to the main passage 32, the bypass valve 38 being responsive to a bypass signal 40 from a control circuit 42 as further described below. As shown in FIGS. 1 and 2, the bypass valve 38 is configured as a three-way valve, and has a pilot actuator 44. As shown in FIG. 1, the bypass valve 38 is positioned for blocking the path to the bypass passage 36, the main passage 32 being open to the gas inlet 24 of the feeder means 22, the delivery system 10 operating in a transport mode.

Preferably, and as shown in the drawings, the hopper 12 forms a closed chamber for confining the media 14 therein, a check valve 49 being provided in a top portion of the hopper 12. The hopper 12 is also formed to include a cone-shaped bottom portion 50 for promoting continuous flow of the media 14 through the hopper outlet 16. However, the hopper 12 is nevertheless subject to the possible formation of a bridge 46 or "rat hole" 48 during flow of the media 14 from the hopper outlet 16, depending on the ever-changing physical properties of the media 14. When the bypass valve 38 is activated as shown in FIG. 2, the system 10 is operative in an override mode whereby the full gas pressure from the main passage 32 is applied through the bypass passage 36 to the hopper passage 18, a portion of the gas moving upwardly in the hopper passage 18 and through the hopper outlet 16. This upward flow of the gas is effective for unblocking the bridge 46 and/or the rat hole 48 that may have formed in the media 14, by direct contact of the gas with the media 14, and secondarily by providing a small shaking or vibration of the sides of the hopper 12 by means of resonance of the gas with the structure of the hopper 12. It has been discovered that when the hopper 12 is relatively high (elongated vertically), it tends to resonate even in a full condition if some of the media 14 is present at the hopper outlet 16, forming a "lake" for interaction with the incoming gas.

An important feature of the present invention is that the upward gas flow into the hopper 12 in the override mode of FIG. 2 is through the hopper outlet 16. Thus no separate mechanism or gas inlet is needed within or on the hopper 12 for stirring or agitating the media 14. Consequently, the design and fabrication of the hopper 12 is greatly simplified, particularly when such other requirements as thermal insulation of the hopper 12 are present. Also, the upward passage of gas is effective in breaking up a blockage of the hopper outlet 16 or the hopper passage itself by the media 14, as would not necessarily be the case with a stirring or agitating mechanism, or even a separate passage for continuous aeration or blasting gas into the hopper 12.

The pressurization of the hopper passage 18 in the override mode provides a further advantage in that the gas pressure from the main passage 32 can break through a blockage that might have formed in the material inlet of the feeder means 22 or the lower portion of the hopper passage 18.

In further accordance with the present invention, pressure sensor or transducer means 52 is coupled to the hopper passage 18 for activating the control circuit 42 in response to an interruption of flow of the media 14 from the hopper 12. For this purpose, the transducer means is connected to the control circuit 42 by a pressure signal 54. The transducer means 52 can provide a contact closure or analogous means for activating the pressure signal 54 when a differential pressure between the hopper passage 18 and a reference such as ambient pressure falls below a predetermined magnitude. Accordingly, in case a blockage such as the bridge 46 or the rat hole 48 forms in the media 14 during the transporting mode of FIG. 1, the relative pressure within the hopper passage 18 is momentarily lowered, the transducer means 52 activating the pressure signal 54 for commencing the override mode of FIG. 2 wherein the bypass valve 38 connects the bypass passage 36 to the main passage 32. A pressure switch suitable for use as the transducer means 52 of the present invention is available as model 1823-2 from Dwyer Instruments, Inc., of Michigan City, Ind.

The control circuit 42 is operative for restoring the transporting mode of FIG. 1 after a predetermined period of time such as 100 mS. For this purpose, the control circuit 42 can incorporate a monostable multivibrator (one-shot) according to conventional electronic circuit methodology. Alternatively, the bypass valve 38 can be selected for providing an appropriate response time such that the transporting mode is automatically restored as a result of the increased gas pressure within the hopper passage 18 upon commencement of the bypass mode of FIG. 2, no special delay being needed from the control circuit 42.

As shown in the drawings, the feeder means 22 is preferably configured as a venturi eductor for feeding the media 14 at flow rates that are dependent on the gas pressure in the main passage 32, that pressure being adjustable in response to the adjustment valve 34. A venturi feeder suitable for use as the feeder means 22 in the present invention is available as GL-1 from Penberthy Houdaille, Inc. of Prophetstown, Ill. The model GL-1 feeder generates a vacuum of approximately 10 inches of Hg when the gas inlet 24 is supplied with a pressure between 60 psi and 110 psi, at a gas flow rate of between about 30 scfm and about 40 scfm. Under these conditions, the pressure within the hopper passage 18 being applied to the transducer means 52 varies over a range of approximately 0.5 inch W.C. to approximately 2.0 inches W.C. Preferably the transducer means 52 is set for activating the pressure signal 54 when the measured pressure falls to between about −2.0 in. W.C. and about 0 in. W.C. It is further preferred that the transducer means 52 be set for inactivating the pressure signal 54 when the measured pressure rises to between about 0 in. W.C. and about 2 in. W.C. More preferably, the pressure signal 54 is activated at about 0 in. W.C. and inactivated at about −1.0 in. W.C.

The combination of the selective pressurization of the hopper passage 18 and the momentary application of such gas pressure is particularly advantageous in that the introduction of gas to the hopper 12 through the hopper outlet 16 is most effective in breaking up impediments to flow in both the hopper 12 and between the hopper outlet 16 and the material inlet 20 of the feeder means 22. Moreover, the momentary application of pressure on demand in response to the transducer means 52 not only conserves the gas but also prevents unnecessary packing of the media 14 within the hopper 12 under conditions of resonance, discussed above.

Figure 7:
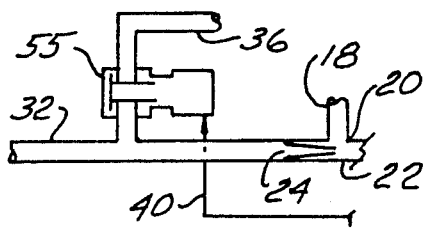
FIG. 7 is a detail pictorial diagram showing an alternative configuration of the system of FIG. 1 within region 7 of FIG. 2.

With further reference to FIG. 7, an alternative configuration of the delivery system 10 has the gas inlet 24 of the feeder means 22 directly connected to the main passage 32, the bypass valve 38 being replaced by a stir valve 55, the stir valve 55 being connected for selectively opening the bypass passage 36 to the main passage 32 for operating the delivery system 10 in a stir mode, further described below.

With further reference to FIGS. 3-6, a preferred configuration of the delivery system 10 further includes a hopper valve 56 for selectively blocking the connection between the hopper outlet 16 and the hopper passage 18. The hopper valve 56 is operated by an associated piloted hopper actuator 58 in response to a hopper signal 60, the hopper signal 60 being generated in a counterpart of the control circuit 42, designated control circuit 62 in FIGS. 3-6. The addition of the hopper valve 56 permits operation of the delivery system 10 in a purging mode as shown in FIG. 5 wherein the full gas pressure from the main passage 32 is applied to the material inlet 20 of the feeder means 22 only. In this mode, even a stubborn blockage of the material inlet 20 is likely to be removed by the applied gas pressure, with significant savings in time and labor for maintenance that might otherwise be required.

In the configuration shown in FIGS. 3-6, the delivery system 10 is further modified from that of FIGS. 1 and 2 by the use of separate two-way valves in place of the three-way configuration of the bypass valve 38 therein. In particular, a gas feed or main valve 64 having a piloted main actuator 66 is connected for selectively closing the main passage 32 to the gas inlet 24 of the feeder means 22 in response to a transport signal 68 from the control circuit 62. A counterpart of the bypass valve 38, designated bypass valve 70 in FIGS. 3-6, is connected for selectively blocking the bypass passage 36 in response to the bypass signal 40, the bypass signal 40 driving a direct solenoid actuator 72 for the bypass valve 70.

As shown in FIGS. 3-6, the control circuit 62 is responsive to an override signal 74 from an override switch 76, and a dispenser signal 78 from a dispenser switch 80, the dispenser switch 80 being located for convenient operator control on a counterpart of the nozzle means 30, designated secondary accelerator or nozzle means 82 in FIGS. 3-6.

The delivery system 10 of FIGS. 3-6 is operative in a transport mode as shown in FIG. 3 wherein the media 14 is metered from the hopper 12 by the feeder means 22, being mixed therein with gas from the main passage 32 and being ejected through the feeder outlet 26, the transport passage 28, exiting at high speed from the nozzle means 82. The transport mode is initially activated by operation of the dispenser switch 80 with the override switch 76 being inactive.

During the transport mode of FIG. 3, in the event that the pressure signal 54 is activated by the transducer means 52 in response to a reduction of pressure in the hopper passage 18, a stir mode is entered as shown in FIG. 4. In the stir mode, gas continues to flow from the main passage 32 into the feeder means 22 via the gas inlet 24 for feeding the media 14 through the material inlet 20 as in the transport mode. In addition, gas is also fed into the hopper passage 18 through the bypass passage 36 as in the override mode of FIG. 2, except that the gas is fed into the hopper passage 18 at reduced pressure because gas flow to the gas inlet 24 is not interrupted. Some of the gas normally flows upwardly into the hopper 12 for stirring the media 14 therein, thereby breaking up a bridge 46 or rat hole 48 that may have formed therein as discussed above. Similarly, some of the gas is directed into the material inlet 20 for removal of a blockage that might have formed in the feeder means 22. After a short period of time, the transport mode of FIG. 3 is restored in response to deactivation of the pressure signal 54 (or timeout of a one-shot circuit of the control circuit 62) as discussed above in connection with FIGS. 1 and 2. Normally, there is only a slight momentary decrease in the rate of flow of the media 14 from the nozzle means 82 as a result of the stir mode being activated.

The control circuit 62 is implemented to be responsive to the time history of occurrences of the stir mode, such that if the stir mode is not successful in removing bridges, rat holes and/or blockages, further remedial action is automatically taken. For this purpose, an up-down counter can be incremented upon each occurrence of the stir mode, and decremented at a predetermined rate. In case the counter reaches or exceeds a predetermined state magnitude, a purge mode is entered as shown in FIG. 5. Circuitry for implementing the up-down counter and associated devices or their equivalents are well known and can be applied by those skilled in the electronic arts. Preferably, the purge mode is entered upon ten or more occurrences of the stir mode within a period of one minute or less.

In the purge mode, the gas inlet 24 of the feeder means 22 is blocked by the main valve 64, and the hopper outlet 16 is blocked by the hopper valve 56 for applying full gas pressure from the main passage 32 to the material inlet 20 of the feeder means 22, thereby breaking up any blockage of the feeder means 22, if possible, without resort to disassembly of the delivery system 10. The purge mode of FIG. 5 can be terminated by deactivation of the dispenser switch 80.

In case the stir mode of FIG. 4 and the purge mode of FIG. 5 are both unsuccessful in restoring normal operation of the delivery system 10, the override switch 76 provides for operator intervention initiating an override mode as shown in FIG. 6. In the override mode, the hopper valve 56 is opened, the main valve 61 remaining closed and the bypass valve 70 remaining open as in the purge mode of FIG. 5. Accordingly, the system 10 is functionally configured in the override mode of FIG. 6 as in the override mode of FIG. 2, discussed above, for applying full gas pressure from the main passage 32 to both the hopper outlet 16 of the hopper 12 and the material inlet 20 of the feeder means 22.

Figure 9:
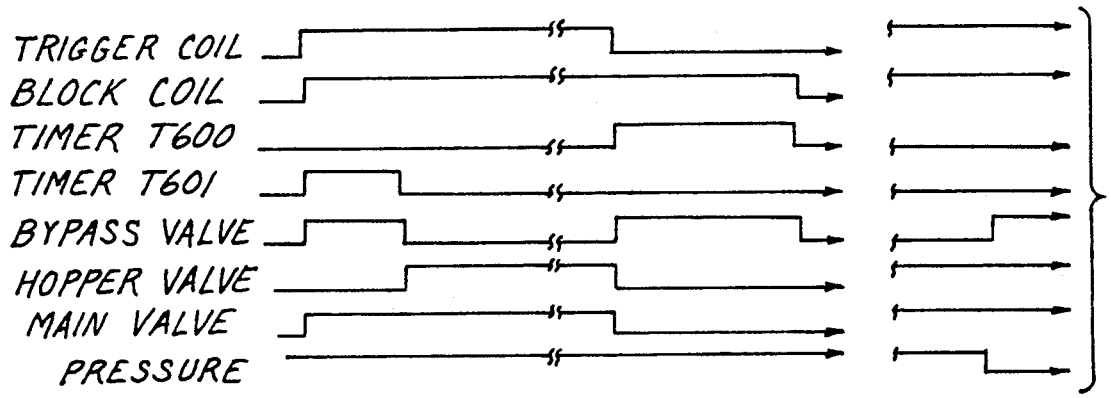
FIG. 9 is a timing diagram for the system of FIG. 8.

With further reference to FIGS. 8 and 9, an experimental prototype of the delivery system 10 of FIGS. 3-6 has been built and operated, the control circuit 62 thereof being implemented by means of a conventional programmable controller having a program module 90 configured as shown in FIG. 8. The program module 90 includes a trigger coil 200 that is activated in response to the activator switch 78, and an associated block coil 201. The bypass valve 70 is activated directly in response to the override switch 76, or when the pressure signal 54 of the transducer means 52 is active while the trigger coil 200 is active. When the trigger coil 200 becomes inactive, a timer T600 of the controller keeps the bypass valve 70 activated for a further period of approximately 2.0 seconds for purging the media 14 from the feeder means 22. The hopper valve 56 is also directly activated by the override switch 76, or by the trigger coil 200 in combination with a timer T601 for preventing an initial flow of the media 14 from the hopper 12 during an initial period of approximately 0.5 seconds following activation of the trigger coil 200, during which the main valve 64 is also activated for permitting gas flow into the gas inlet 24, insuring that the feeder means 22 is not partially clogged with the media 14 at the onset of the transporting mode. This sequence of events is also depicted in the timing diagram of FIG. 9.

As shown in FIG. 9, a momentary first purging mode is initiated by the activation of the trigger coil 200 during the operation of the timer T601, the first purging mode differing from the purging mode of FIG. 5 in that the main valve 64 is open instead of closed. Upon deactivation of the trigger coil 200, a momentary second purging mode is initiated during the operation of the timer T600, the configuration of the delivery system 10 being the same as shown in FIG. 5. As discussed above, the first and second purging modes are automatically included in operation of the delivery system 10 for insuring that the feeder means 22 is not clogged at the onset of the transporting mode. In case of a blockage, or other cause resulting in absence of flow of the media 14 into the material inlet 20 during the transporting mode, the transducer means 52 activates the pressure signal 54 in response to a drop in pressure within the hopper passage 18, thereby activating the bypass valve for initiating the stirring mode as depicted in FIG. 4.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A system for delivering a particulate material, comprising:
   (a) a storage hopper for the material, the hopper having a bottom hopper outlet;
   (b) feeder means for feeding the material, the feeder means having a material inlet and a feeder outlet;
   (c) a hopper passage connecting the hopper outlet to the material inlet of the feeder means;
   (d) stir means for selectively agitating the material in the hopper, comprising means for connecting a source of pressurized gas to the hopper passage between the hopper and the material inlet of the feeder means in response to a stir signal.

2. The apparatus of claim 1, further comprising means for periodically activating the stir signal.

3. The apparatus of claim 1 wherein the storage hopper forms a closed chamber, the apparatus further comprising a check valve connected to a top portion of the chamber for venting positive pressure from the chamber.

4. The apparatus of claim 1 wherein the inside of the hopper is formed with a cone shaped bottom portion.

5. The apparatus of claim 1 further comprising hopper outlet valve means for closing the hopper outlet.

6. The apparatus of claim 1 wherein the hopper outlet is located above the material inlet of the feeder means, the hopper passage being oriented vertically.

7. The apparatus of claim 1 wherein the feeder means comprises an eductor that includes a gas inlet, and means for connecting the gas inlet to the source of pressurized gas.

8. The apparatus of claim 7 further comprising a three-way valve having a common connection to the source of pressurized gas, the means for connecting the gas to the hopper passage comprising a normally closed path of the three-way valve, the means for connecting the gas inlet to the source comprising a normally open path of the three-way valve.

9. The system of claim 7, wherein the means for connecting the source to the hopper passage comprises a stir valve, the stir valve being responsive to the stir signal, and the means for connecting the gas inlet to the source comprises a gas feed valve.

10. The system of claim 9, wherein the gas feed valve is openable in response to a feed signal.

11. The system of claim 10, further comprising a hopper outlet valve for closing the hopper outlet, the hopper outlet valve being openable in response to a hopper signal, whereby the system is operative in:
   (a) a transporting mode wherein the hopper signal is activated, the feed signal is activated, and the stir signal is inactive;
   (b) a stirring mode wherein the hopper signal is activated and the stir signal is activated;
   (c) a purging mode wherein the hopper signal is inactive the stir signal is activated, and the feed signal is inactive; and
   (d) an override mode wherein the hopper signal is activated, the stir signal is activated, and the feed signal is inactive.

12. A system for delivering a particulate material, comprising:

(a) a storage hopper for the material, the hopper having a bottom hopper outlet;
(b) feeder means for feeding the material, the feeder having a material inlet and a feeder outlet, the material inlet being in fluid communication with the hopper outlet;
(c) stir means for agitating the material in the hopper in response to a stir signal, comprising means for feeding a pressurized gas into the hopper through the hopper outlet;
(d) sensor means between the hopper outlet and the material inlet for activating the stir signal in response to an absence of flow of the material into the material inlet.

13. The apparatus of claim 12 wherein the stir means is operative for a predetermined first period of time in response to the sensor means.

14. The apparatus of claim 12, further comprising means for periodically activating the stir signal.

15. The apparatus of claim 12 wherein the sensor means comprises means for sensing a relative pressure proximate the material inlet.

16. The apparatus of claim 15 wherein the stir signal is activated in response to the sensed pressure being below a predetermined level.

17. A system for delivering a particulate material, comprising:
(a) a storage hopper for the material, the hopper having a bottom hopper outlet;
(b) feeder means for feeding the material, the feeder having a material inlet and a feeder outlet, the material inlet being in fluid communication with the hopper outlet;
(c) stir means for agitating the material in the hopper for a predetermined first period of time in response to a stir signal;
(d) sensor means for activating the stir signal in response to an absence of flow of the material into the material inlet; and
(e) means for reconfiguring the system upon occurrence of a predetermined number of activations of the stir signal in response to the sensor means within a fixed second period of time.

18. A system for delivering a particulate material, comprising:
(a) a storage hopper for the material, the hopper forming a closed chamber and having a bottom hopper outlet and a check valve connected to a top portion of the chamber for venting positive pressure from the chamber;
(b) an eductor for feeding the material, the eductor having a material inlet, an eductor outlet, and a gas inlet, and a gas feed valve, the gas feed valve being openable in response to a feed signal for connecting the gas inlet to the source of pressurized gas;
(c) a hopper passage connecting the hopper outlet to the material inlet of the eductor;
(d) a hopper outlet valve for closing the hopper outlet, the hopper outlet valve being openable in response to a hopper signal;
(e) stir means for agitating the material in the hopper, comprising a stir valve for connecting a source of pressurized gas to the hopper passage, the stir valve being openable in response to a stir signal; and
(f) sensor means for activating the stir signal in response to an absence of flow of the material into the material inlet,
whereby the system is operative in:
(i) a transporting mode wherein the hopper signal is activated, the feed signal is activated, and the stir signal is inactive;
(ii) a stirring mode wherein the hopper signal is activated and the stir signal is activated;
(iii) a purging mode wherein the hopper signal is inactive, the stir signal is activated, and the feed signal is inactive; and
(iv) an override mode wherein the hopper signal is activated, the stir signal is activated, and the feed signal is inactive.

19. The apparatus of claim 18 wherein the stir means is operative for a predetermined first period of time in response to the sensor means.

20. The apparatus of claim 19 further comprising means for deactivating the system upon occurrence of a predetermined number of activations of the stir signal in response to the sensor means within a fixed period of time.

* * * * *